(12) United States Patent
Chen

(10) Patent No.: US 7,349,570 B2
(45) Date of Patent: Mar. 25, 2008

(54) GRAPHIC IMAGE TO 3D IMAGE CONVERSION DEVICE

(76) Inventor: Chuan-Sheng Chen, PMB#1008, 1867 Ygnacio Valley Rd., Walnut Creek, CA (US) 94590

( * ) Notice: Subject to any disclaimer, the term of this patent is extended or adjusted under 35 U.S.C. 154(b) by 722 days.

(21) Appl. No.: 10/868,213

(22) Filed: Jun. 16, 2004

(65) Prior Publication Data

US 2005/0280643 A1    Dec. 22, 2005

(51) Int. Cl.
- *G06K 9/00* (2006.01)
- *G06K 9/36* (2006.01)
- *H04N 15/00* (2006.01)
- *G02B 27/22* (2006.01)

(52) U.S. Cl. ............ 382/154; 382/162; 382/276; 348/51; 359/462; 359/466

(58) Field of Classification Search .......... 382/154, 382/162–167, 276, 277, 284–285; 348/51, 348/53–60; 359/462–469
See application file for complete search history.

(56) References Cited

U.S. PATENT DOCUMENTS

| | | | | |
|---|---|---|---|---|
| 3,903,358 A * | 9/1975 | Roese | ............... | 348/57 |
| 3,992,573 A * | 11/1976 | White | ............... | 348/55 |
| 4,214,267 A * | 7/1980 | Roese et al. | ............... | 348/E13.04 |
| 4,424,529 A * | 1/1984 | Roese et al. | ............... | 348/56 |
| 4,562,463 A * | 12/1985 | Lipton | ............... | 348/56 |
| 4,698,668 A * | 10/1987 | Milgram | ............... | 348/56 |
| 4,836,647 A * | 6/1989 | Beard | ............... | 359/464 |
| 4,884,876 A * | 12/1989 | Lipton et al. | ............... | 348/56 |
| 4,943,852 A * | 7/1990 | Femano et al. | ............... | 348/49 |
| 4,979,033 A * | 12/1990 | Stephens | ............... | 348/56 |
| 5,007,715 A * | 4/1991 | Verhulst | ............... | 348/51 |
| 5,101,269 A * | 3/1992 | Shelley et al. | ............... | 348/47 |
| 5,222,154 A * | 6/1993 | Graham et al. | ............... | 382/162 |
| 5,430,474 A * | 7/1995 | Hines | ............... | 348/42 |
| 5,457,554 A * | 10/1995 | Faris | ............... | 349/13 |
| 5,510,832 A * | 4/1996 | Garcia | ............... | 348/56 |
| 5,570,150 A * | 10/1996 | Yoneyama et al. | .. | 348/E13.024 |
| 6,037,971 A * | 3/2000 | McLaine et al. | ............... | 348/47 |
| 6,748,105 B1 * | 6/2004 | Mancuso et al. | ............... | 382/154 |
| 6,831,678 B1 * | 12/2004 | Travis | ............... | 348/46 |
| 7,120,293 B2 * | 10/2006 | Schoelkopf et al. | ............... | 382/162 |

* cited by examiner

*Primary Examiner*—Jingge Wu
*Assistant Examiner*—Manav Seth
(74) *Attorney, Agent, or Firm*—Leong C. Lei

(57) ABSTRACT

A device applicable to computers, TV sets, and projectors for converting a graphic image into a 3D image includes an image input loop, image control loop, output parity horizontal translation image IR circuit, and IR spectacles, wherein the IR spectacles create masking effect on both eyes, a CF lens is used to receive images of horizontal translation in conjunction with personal persistence of vision, and images are combined in the viewer's brain to present a 3D image.

3 Claims, 3 Drawing Sheets

GRAPHIC IMAGE TO 3D IMAGE CONVERSION DEVICE

BACKGROUND OF THE INVENTION (a) Technical Field of the Invention

The present invention is related to a device to convert a graphic image of a video game or film into two images in sequence of horizontal translation to display a 3D picture, and more particularly to one that works on physical principles incorporated with electronic technology to convert a graphic into a 3D picture, and the picture received by a pair of spectacles is transmitted to one's brain to view the 3D picture, or video game and image through personal persistence of vision.

(b) Description of the Prior Art

In the prior art, an RB polarizing filter is used to create 3D image by taking advantage of visual variance to produce 3D effects. Thanks to the rapid development of technology, the image is produced into a 3D image by a software application. Once the image is produced, the 3D effect is present to the viewer. However, such a 3D effect actually achieves only half of the effect by failing to completely present the genuine 3D image.

Referring to FIG. 1 of the accompanying drawings, since the computer has been introduced, any type of computer 100 displays only a graphic 101. All high-tech manufacturers have been working hard on giving their computers even faster operation speed and larger capacity beyond one's imagination. Personal computer use has become the norm. In one's ordinary life, a computer is the center for producing documents, playing video games, surfing the Internet, design and viewing films as the computer is sufficient to fully support these activities. However, scientific technology allows unlimited space for imagination. Theories start from imagination; and production gives way to more theories. There must be a boundless range of products expected in the course of production. Before yielding the product, the most important link other than state-of-art technology and principles is to change the time of the invariable laws for user satisfaction and putting the user into hi-tech products. The present invention is a product developed from the imagination described above.

SUMMARY OF THE INVENTION

It is to be noted that the present invention is applicable to computer, TV set and projector; however, for the convenience of the disclosure, computer only is used for the description of the present invention.

The primary purpose of the present invention is to provide a device to convert graphic into 3D image. To achieve the purpose, time lapse is created through special electronic principles from the time of creating current using physical principles. Again physical principles are incorporated to produce the phenomenon of horizontal translation. Both eyes of a viewer receive the images and those images are incorporated in the brain of the viewer to create 3D effect. The device is essentially comprised of image input loop, image control loop, image output of parity horizontal translation IR circuit, and IR spectacles to receive image. Wherein, image input separate the image and color through image input loop, the image is then divided into odd field and even field images through image control loop. Time lapse controller is used to defer odd or even filed image for the image to be integrated by controller of horizontal translation loop to create image and deliver the image to digital detector for the color to be reduced. Image input loop divides the image into two portions, one portion having the image revised to generate lateral translation signals through image shaping and divider for linking lateral translation signals to link to translation controller to be properly adjusted with image translation adjustment knob as desired by the viewer; while the other portion having the processed images outputted through image input loop to the IR circuit of output parity horizontal translation image to be further received by the IR spectacles. Working on optical principles, IR spectacles produce the masking effect on both eyes of the viewer and the personal persistence of vision help the images to be combined in the brain of the viewer for 3D image to be displayed. The present invention converts a graphic into 3D image to enable a better source of entertainment, achieve the purpose of complementary results of combining technology and life, and develop further a virtualized scenario.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
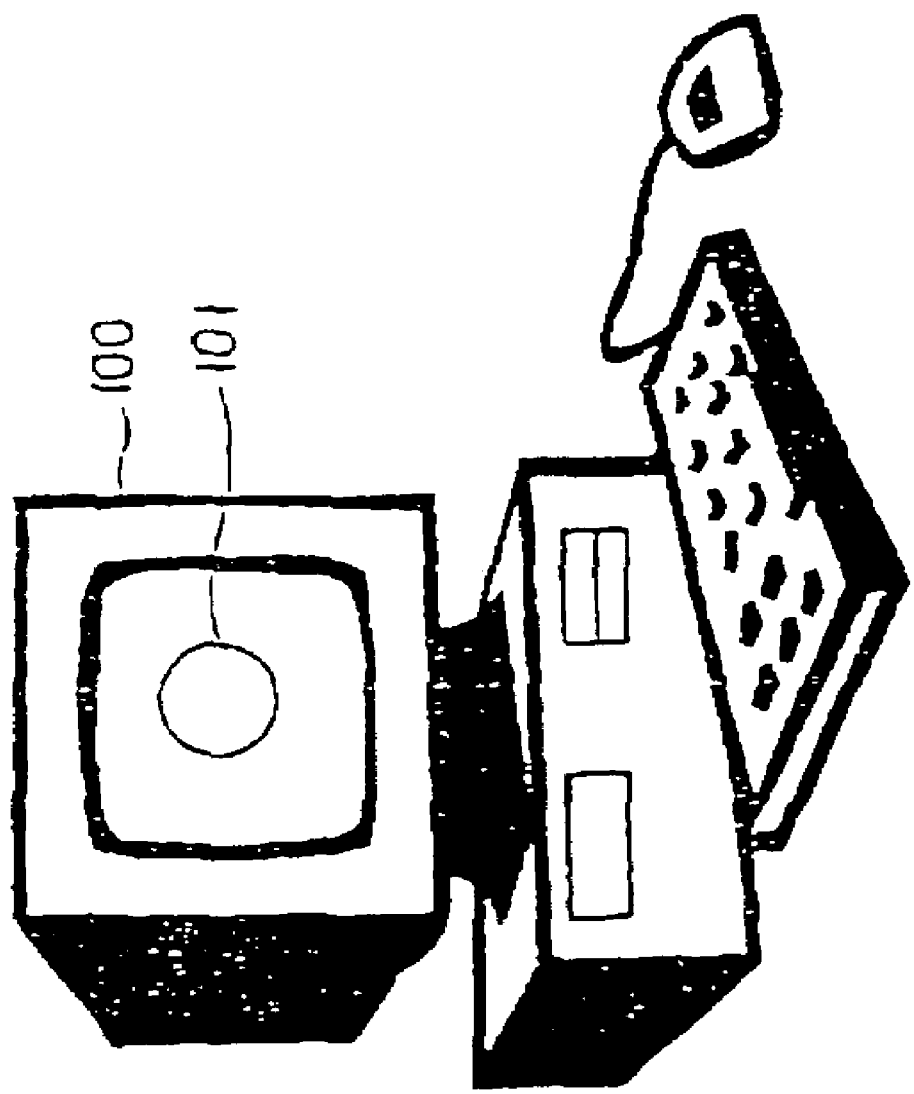
FIG. 1 is a schematic view showing that only graphics can be displayed on the screen of the monitor in a computer system.
Figure 2:
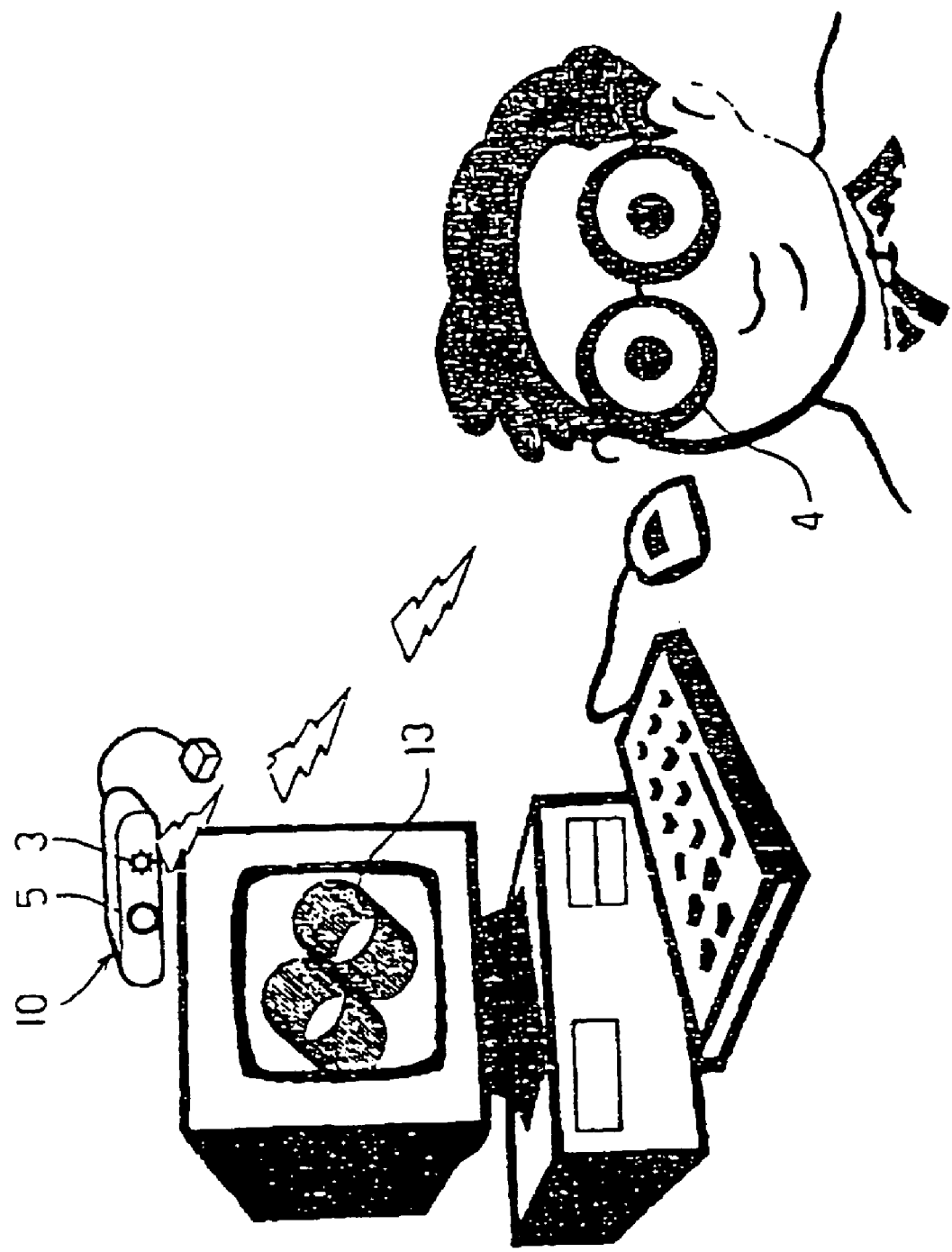
FIG. 2 is a schematic view showing a preferred embodiment of the present invention and image translation.
Figure 3:
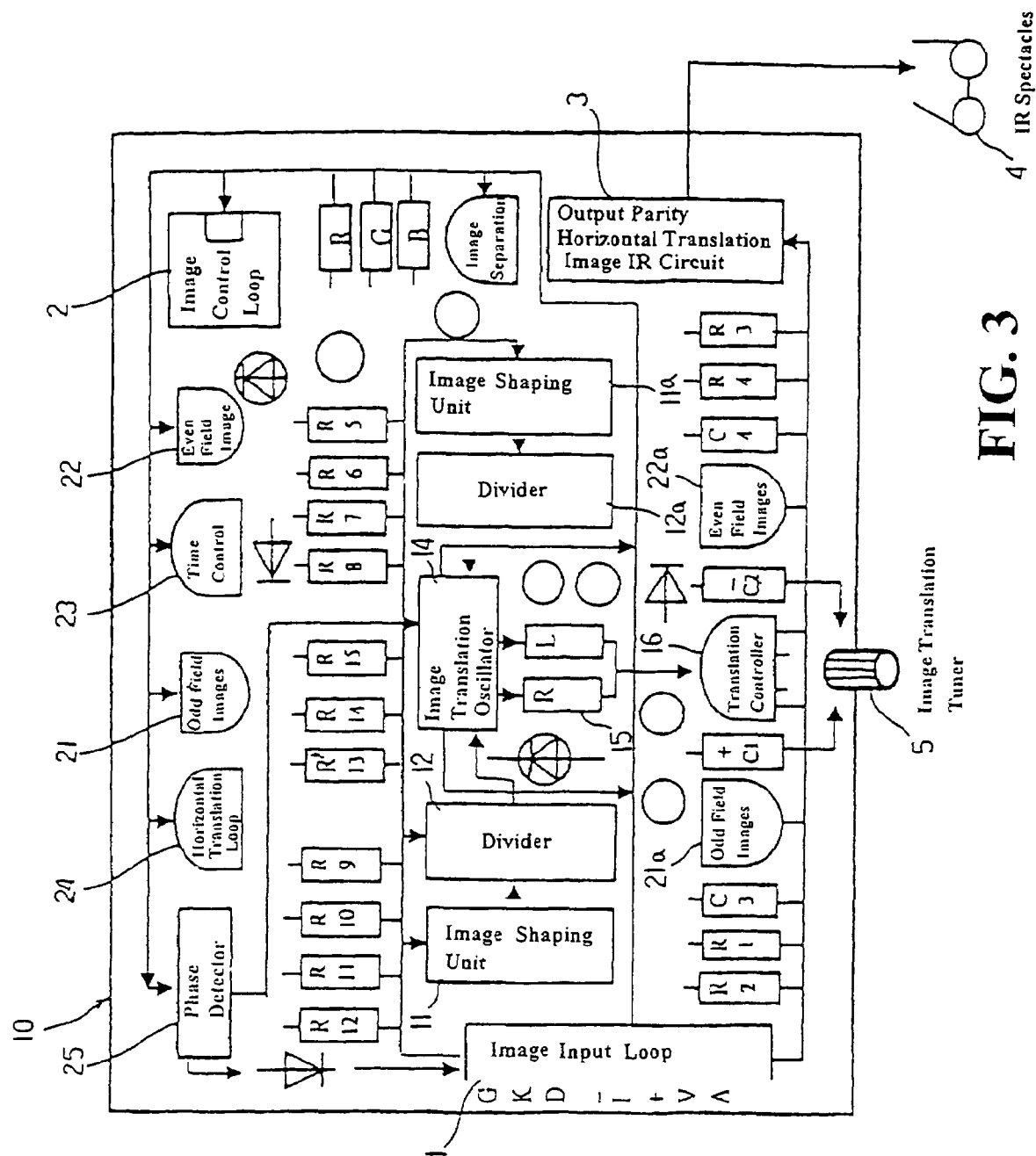
FIG. 3 is a wiring diagram of the present invention.

Referring to FIGS. 2 and 3, a preferred embodiment of the present invention is essentially comprised of an image input loop 1, an image control loop 2, an output parity horizontal translation image IR circuit 3, and a pair of IR spectacles 4. After the process by a wave-shaping circuit 11, the image is transmitted to a divider 12 under the control of the image input loop 1 to be separated into an odd image 21 and an even image 22. The image after the separated is transmitted to a phase detector 25 through a time lapse controller 23 to produce a horizontal translation loop 24, then two transmission loops are created through the image input loop 1. The first one of the transmission loops transmits the separated image to an image shaping unit 11a, a divider 12a, an image translation oscillator 14B, and a lateral adjuster 15 to a translation controller 16 for the adjustment of the position of the image horizontal translation. The second one of the transmission loops transmits the parity images 21, 22 to the parity horizontal translation image IR circuit 3 and then to the IR spectacles 4.

In the preferred embodiment, the picture of the image is given proper parity image translation to present on the screen. The viewer wears the parity spectacles to view 3D image through the fast masking function of CF lens (liquid-crystal film) of the IR spectacles.

In the preferred embodiment, the output of the image translation does not require any software or other devices, and the IR spectacles can immediately receive the outputted image, whether it be a static picture, photo, PC games, film, on-line, or operation system. With the present invention, the manipulation of graphic and 3D image can be done in a snap. A tuner 5 is provided in the present invention for tuning the image translation to compromise the preference of the individual viewer.

Whereas the IR spectacles relates to a hi-tech product of color liquid-crystal film, the updated frequency produced on the liquid-crystal film could reach up to 1000 times per second. Accordingly, the viewing quality will not be affected by flaring. During the transmission of the separated images, an IR receiver provided on the liquid-crystal film spectacles to receive the images present the real time 3D effect.

The present invention provides the following features:
1. Electronic Principles: the image transmission is done by a display card adapted to the computer, and data of the image are compressed on the display card for direct display by a monitor. Meanwhile, the operation system and drive software of the display card adapted to the computer display vivid image. Colors of the image become even more live and diversified via the display card using electronic principles.
2. Physical principles: In the course of image transmission and receiving, many procedures take place from image compression, image decompression, retrieval and play, reorganization and reduction. A number flows are completed to present the true picture. However, all these flows function upon phototonus principles created by multiple courses of voltage and amperage. While voltage and amperage determine the transmission of image, the resultant image volts decide the quality of video and audio signals. Processed by applying physical principles, direction of voltage and amperage are changed or reduced to create different images without changing color and sound in the course of transmission. However, for having been changed through physical change and electronic transmission, the image after special process is reduced to immediately provide different pictures. In turn, these pictures are received to present real-time 3D image to the viewer.
3. Physiological principles: People vary depending on their individual physiology; however, the difference in response and reaction are not logically so much different among individuals. Therefore, once a piece of information is received either through one's eyes, ears or touching, it is first processed in both sides of one's brain before coming up with the response. There is a pause in the process of response in brain. The duration of the pause is very short. The faster the process is in one's brain, the faster response is. However, no matter how fast the response process may be, there is the time of pause. That's the time the present invention relies upon to incorporate physical and electronic principles for the response to present various pictures.
4. Persistence of vision: when we take a look at an object, we see it through both eyes. There is the difference in angle or location viewed between both eyes, and the vision becomes what we see after the integration in our brains. Therefore, the persistence of vision is applied in the image to transmit the image through a specially designed receiver to our eyes and we see a 3D image.
5. Image receiver (spectacles): CF (LIQUID-CRYSTAL FILM), the hi-tech product surrenders the: human persistence of vision to electronic control. By taking advantage of the rapid masking function of CF at a rate several folds of that of human being's response. Therefore upon receiving the 3D image converted by the present invention, the viewer won't feel any uncomfortable, instead, he's enjoying clearer, truer color and finer 3D pictures.
6. Operation of Layer: Through image transmission, the image is retrieved and compressed in various software for transmission; and when received and decompressed by the display card, noises are removed to reduce for the true image and color, and further reduced upon the creation of time lapse using the physical principles before being outputted to be picked up by the IR receiver, i.e., the pair of spectacles to present various 3D images using physiological principles and the function of persistence of vision.
7. After several courses of transmission, the image is compressed, decompressed, and finally delivered to the viewer. Physiological response of the viewer is one of those critical links in the entire process of image transmission, receiving through eyes and combination response in the brains to present the image to the viewer and for the contents of the program broadcast to be felt by the viewer. Electronic transmission works by the combination of physical and mechanical principles. Once the image is present to the viewer through any display, the response rate of the eyes is 60 frames per second, that is, thirty frames for each eye. Whereas, both eyes receiving the images at different angle and direction to compose an image within visible range to both eyes.
8. If the viewer uses his right eye to look into the right direction; and his left eye, the left direction through the masking function provided by the LIQUID-CRYSTAL FILM spectacles, all the pictures in sight, static or mobile, are be present in 3D images. Generally, the picture transmitted is in the form of graphic and is so shot during its production; therefore, the image is seen as a graphic. However, with the process of image horizontal translation, the resultant fast translation of the image can be seen as a 3D image when received through a special spectacles and the human persistence of vision.
9. When the same image is processed with horizontal translation, a 3D image is produced insight through electronic transmission and physical principles. The same is applicable to film or PC game.
10. When the image is received and delivered to the brain of the viewer, the image is first received at a particular angle by the eyes of the viewer before being delivered to the both sides of the brains for analysis and combination to be seen through the lens. In the course of image delivery, the persistence of vision will produce the feelings that the image is sometimes rising and other times falling, a typical physiological response due to the vision when the viewer is looking at a 3D picture.

As the scientific technology advances by day, it is the general topic on how to upgrade personal living quality and how to invent new products while upgrading the personal living quality so that everyone is able to enjoy all the benefits brought by the hi-tech.

In all the modern products including electronic, optical, digital and biotech products though advancing very rapidly, it is our objective, also the core of our technical development to incorporate scientific technology and biotechnology. The present invention incorporates scientific technology and biotechnology to introduce another totally different virtualized scenario to give extra color to daily life. The present invention by converting all the animation and games into 3D pictures for the viewer wearing a pair of IR spectacles infuses leisure and work in bringing an even more versatile life is indeed is a diversified innovation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A device to convert a graphic image into a 3D image comprising an image input loop, an image control loop, an output parity horizontal translation image IR circuit, and a pair of IR spectacles to receive parity horizontal translation images; the image being transmitted through the image input loop and a wave shaping unit to a divider; the image being then separated for RGB colors before transmitted to the image control loop for further separation of images of odd field and even field; the separated images being processed by a horizontal translation loop produced by a time lapse controller and transmitted to a phase detector; two transmission loops being produced through the image input loops; the image being separated in the first one of the transmission loop before being transmitted to the divider through the image wave shaping unit, then through an image translation oscillator to a translation controller via a lateral adjustment unit for achieving a proper lateral translation location; images of odd field and even filed being transmitted in the second one of the transmission loop via the image input loop to the IR circuit; signals of the image being transmitted through the IR circuit to be picked up by the pair of IR spectacles; and the image being present in a 3D image by masking effect on optical principles of the lit spectacles and physiological persistence of vision for the image to be combined in brain of a viewer.

2. The device to convert a graphic image into a 3D image as claimed in claim 1; wherein an image translation tuner is provided to facilitate the turning by the viewer depending on personal preference.

3. The device to convert a graphic image into a 3D image as claimed in claim 1; wherein a liquid-crystal film (CF) is used for the IR spectacles.

* * * * *